(12) United States Patent
Han et al.

(10) Patent No.: US 10,982,606 B2
(45) Date of Patent: Apr. 20, 2021

(54) ENGINE SYSTEM (71) Applicants: Hyundai Motor Company, Seoul (KR); Kia Motors Corporation, Seoul (KR)

(72) Inventors: Dong Hee Han, Seoul (KR); Dong Ho Chu, Yongin-Si (KR); Kwanhee Lee, Suwon-Si (KR); Yeongseop Park, Seoul (KR); Seungwoo Hong, Seoul (KR); Jaegu Kang, Seoul (KR); Jungjoo Park, Gunpo-Si (KR); Heechang Oh, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/657,144

(22) Filed: Oct. 18, 2019

(65) Prior Publication Data
US 2020/0182170 A1 Jun. 11, 2020

(30) Foreign Application Priority Data

Dec. 7, 2018 (KR) .......................... 10-2018-0157506

(51) Int. Cl.
*F02D 41/00* (2006.01)
*F02M 26/04* (2016.01)
(Continued)

(52) U.S. Cl.
CPC .......... *F02D 41/0007* (2013.01); *F02B 39/10* (2013.01); *F02D 31/002* (2013.01); *F02D 41/0205* (2013.01); *F02M 26/04* (2016.02)

(58) Field of Classification Search
CPC ............... F02D 41/0007; F02D 31/002; F02D 41/0205; F02B 39/10; F02M 26/04
See application file for complete search history.

(56) References Cited

U.S. PATENT DOCUMENTS

6,751,949 B2 * 6/2004 Tamura ............... F02D 41/0087
60/284
9,523,309 B2 * 12/2016 Kim ........................ F02B 37/16
(Continued)

*Primary Examiner* — Shafiq Mian
(74) *Attorney, Agent, or Firm* — Morgan, Lewis & Bockius LLP (57) ABSTRACT

An engine may include an engine including combustion chambers, an intake line connected to the plurality of combustion chambers and through which outside air supplied to the combustion chamber flows, an intake manifold connected to an intake side of the combustion chamber, an exhaust manifold connected to an exhaust side of the combustion chamber, an exhaust line connected to the exhaust manifold, a turbocharger including a compressor mounted in the intake line, and a turbine rotating in association with the compressor and connected to the exhaust manifold and the exhaust line, a wastegate passage bypassing the turbine from the exhaust manifold, an electric supercharger connected to the compressor of the turbocharger by the intake line, a power device electrically-connected to the electric supercharger and configured for supplying electric power to the electric supercharger or absorbing and storing electric power generated by the electric supercharger, and a controller for controlling the operation of the power device and the electric supercharger according to rotation speed of the engine.

11 Claims, 5 Drawing Sheets

(51) Int. Cl.
*F02D 31/00* (2006.01)
*F02D 41/02* (2006.01)
*F02B 39/10* (2006.01)

(56) References Cited

U.S. PATENT DOCUMENTS

| | | | |
|---|---|---|---|
| 2007/0209611 A1* | 9/2007 | Buck | F01L 1/146 123/41.31 |
| 2013/0333360 A1* | 12/2013 | Han | F02B 37/04 60/289 |
| 2015/0167593 A1* | 6/2015 | Kim | F02B 37/18 60/600 |
| 2018/0135569 A1* | 5/2018 | Han | F02M 26/46 |
| 2018/0361844 A1* | 12/2018 | Kinzuka | B60K 6/24 |

* cited by examiner

ENGINE SYSTEM

CROSS-REFERENCE TO RELATED APPLICATION

The present application claims priority to Korean Patent Application No. 10-2018-0157506 filed on Dec. 7, 2018, the entire contents of which is incorporated herein for all purposes by this reference.

BACKGROUND OF THE INVENTION

Field of the Invention

The present invention relates to an engine system. More particularly, the present invention relates to an engine including a turbocharger and a supercharger to supply supercharged air to the engine.

Description of Related Art

An engine of a vehicle generates the power by mixing the air introduced from the outside thereof with the fuel in an appropriate ratio and burning it.

In a process of generating the power by driving the engine, the external air for the combustion may be appropriately supplied to obtain a desired output and combustion efficiency. For this, a turbocharger as a device configured for turbocharging the air for the combustion to increase the combustion efficiency of the engine is used.

In general, a turbocharger is a device that rotates a turbine by use of pressure of exhaust gas discharged from an engine and thereby increases output of the engine by supplying high-pressure air to a combustion chamber by use of rotational force thereof. The turbocharger is applied to most diesel engines and has also recently been applied to gasoline engines.

As another example of an intake boost device, an electric supercharger using a motor to drive a compressor to compress external air has been used. Since the electric supercharger is driven by a battery, there is little boost, and it mainly supplies supercharged air to the combustion chamber in a low speed and low load region.

Generally, to perform boost control of an engine provided with a turbocharger, a bypass passage provided in the exhaust passage connected to the turbine of the turbocharger and a wastegate valve for controlling the bypass exhaust flow rate flowing through the bypass passage are used. For the control of the wastegate valve, a pneumatic or electro-mechanical wastegate actuator is used.

However, if a high back pressure is formed by closing the wastegate valve for boost control in the low-middle-speed region, this causes a high residual gas amount, which is disadvantageous in terms of the continuous operation of the engine due to knocking and the like.

Furthermore, due to the wastegate passage and the valve layout, the structure complexity of the turbine housing is increased, which is disadvantageous in terms of durability. Furthermore, when the flow path is separated as in the case of a twin scroll turbo, unbalance of the back pressure of each flow path occurs.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine system having a twin-scroll turbocharger including a wastegate passage of a specific cross-sectional area without a wastegate valve.

An engine system according to an exemplary embodiment of the present invention may include an engine including a plurality of combustion chambers generating driving torque by combustion of fuel, an intake line connected to the plurality of combustion chambers and through which outside air supplied to the combustion chamber flows, an intake manifold connected to an intake side of the combustion chamber, an exhaust manifold connected to an exhaust side of the combustion chamber, an exhaust line connected to the exhaust manifold and through which the exhaust gas flows, a turbocharger including a compressor mounted in the intake line, and a turbine rotating in association with the compressor and connected to the exhaust manifold and the exhaust line, a wastegate passage bypassing the turbine of the turbocharger from the exhaust manifold to be connected to the exhaust line, an electric supercharger connected to the compressor of the turbocharger by the intake line, a power device electrically-connected to the electric supercharger and configured for supplying electric power to the electric supercharger or absorbing and storing electric power generated by the electric supercharger, and a controller for controlling the operation of the power device and the electric supercharger according to rotation speed of the engine.

An air cleaner for filtering outside air may be mounted at an inlet of the intake line.

A water-cooled intercooler may be mounted inside the intake manifold of the engine to cool the outside air flowing into the intake manifold through the intake line.

An air-cooled intercooler for cooling the outside air flowing through the intake line may be mounted on the intake line at the front end portion of the intake manifold of the engine.

A throttle valve for controlling the air amount supplied to the combustion chamber may be mounted at an intake manifold inlet of the engine.

An engine system according to an exemplary embodiment of the present invention may further include an exhaust gas purifying apparatus configured for purifying an exhaust gas on the exhaust line at a rear end portion of the exhaust manifold of the engine.

A bypass line that can bypass the outside air introduced from the intake line to prevent the outside air from passing through the supercharger and a bypass valve provided inside the bypass line may be provided at the inlet of the electric supercharger.

The wastegate passage may have a fixed cross-sectional area of the passage, and the exhaust gas discharged from the exhaust manifold may flow into the turbine or the wastegate passage according to the rotation speed of the engine.

The exhaust gas may flow into the wastegate passage and flow to the exhaust line in the region where the engine speed is low, and the exhaust gas may flow into the turbine and flow to the exhaust line in a region where the engine speed is high.

The controller may be configured to control the power device to supplement the engine torque by supplying electric power to the electric supercharger to operate the electric supercharger in the region where the engine speed is low.

The controller may be configured to control the speed of the electric supercharger to generate a differential pressure and to regenerate the electromotive force generated thereby as boost energy in a region where the engine speed is high.

The controller may be configured to determine that the engine speed is high if the engine speed is equal to or more than 1500 rpm, and that the engine speed is low if the engine speed is less than 1500 rpm.

According to an exemplary embodiment of the present invention, when the engine is in the low speed region, the electric power is supplied to the electric supercharger to minimize the back pressure, and as the residual gas in the combustion chamber is reduced, it is possible to improve combustion by high compression ignition.

Furthermore, during the high speed region boosting, the extra boost energy can be regenerated by utilizing the electromotive force generated by controlling the speed of the electric supercharger. Thus, it is possible to realize an efficient boosting system according to the surplus exhaust energy regeneration.

Furthermore, a fixed wastegate flow path is provided, and a conventional wastegate actuator is omitted. Therefore, the structure of the engine system may be simplified, and it is advantageous to mount the turbocharger.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Furthermore, in exemplary embodiments of the present invention, since like reference numerals designate like elements having the same configuration, various exemplary embodiments is representatively described, and in other exemplary embodiments of the present invention, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Also, to the same structure, element, or component appearing in more than one of the figures, the same reference numerals are used to denote similar features. It will be understood that when an element such as a layer, film, region, or substrate is referred to as being "on" another element, it may be directly on the other element or intervening elements may also be present.

The exemplary embodiment of the present invention shows an exemplary embodiment of the present invention in detail. As a result, various modifications of the drawings will be expected. Therefore, the exemplary embodiment of the present invention is not limited to a specific aspect of the illustrated region, and for example, includes modifications of an aspect by manufacturing.

Now, an engine system according to an exemplary embodiment of the present invention will be described with reference to FIG. 1 and FIG. 3.

Figure 1:
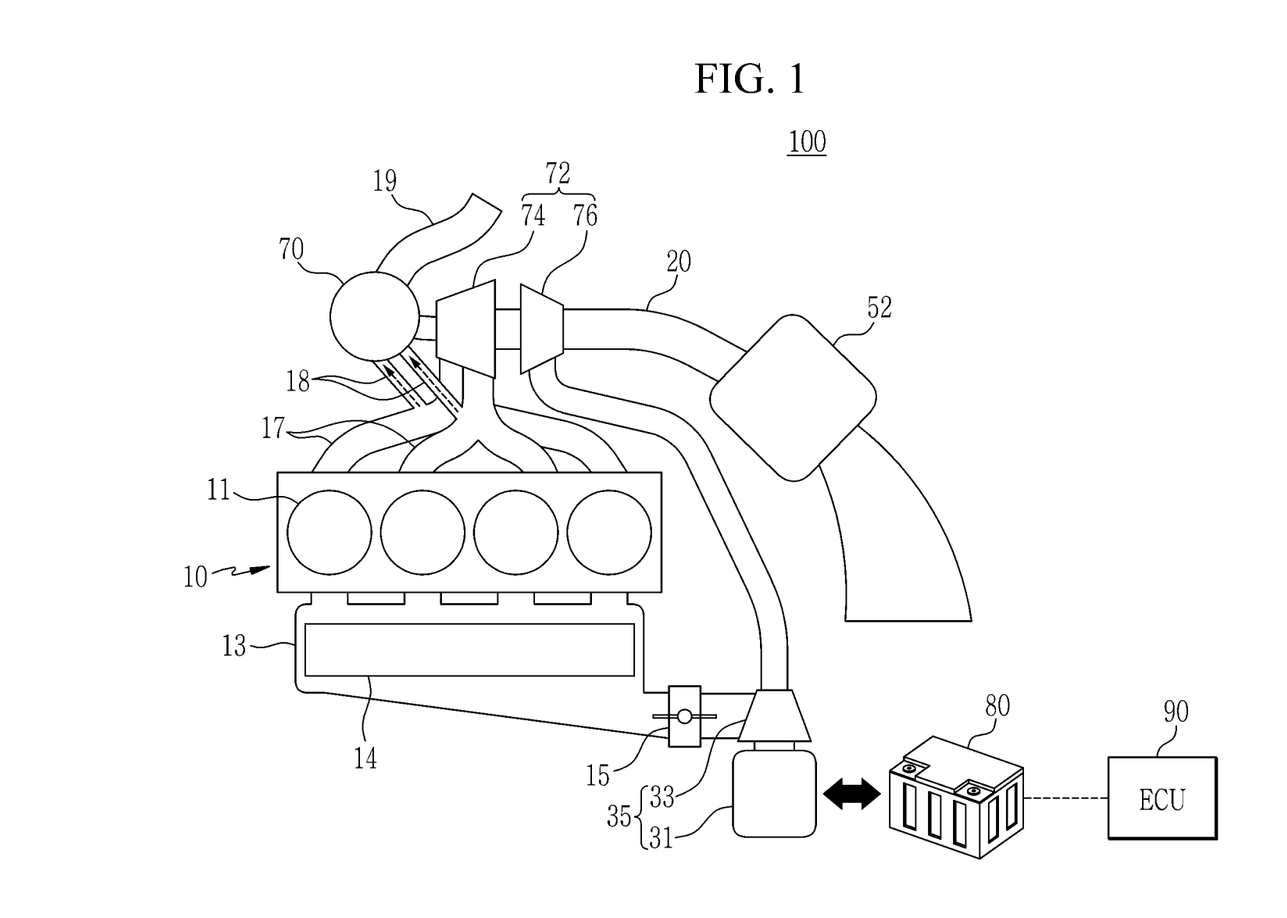
FIG. 1 is a conceptual diagram schematically showing an engine system according to an exemplary embodiment of the present invention.
Figure 2:
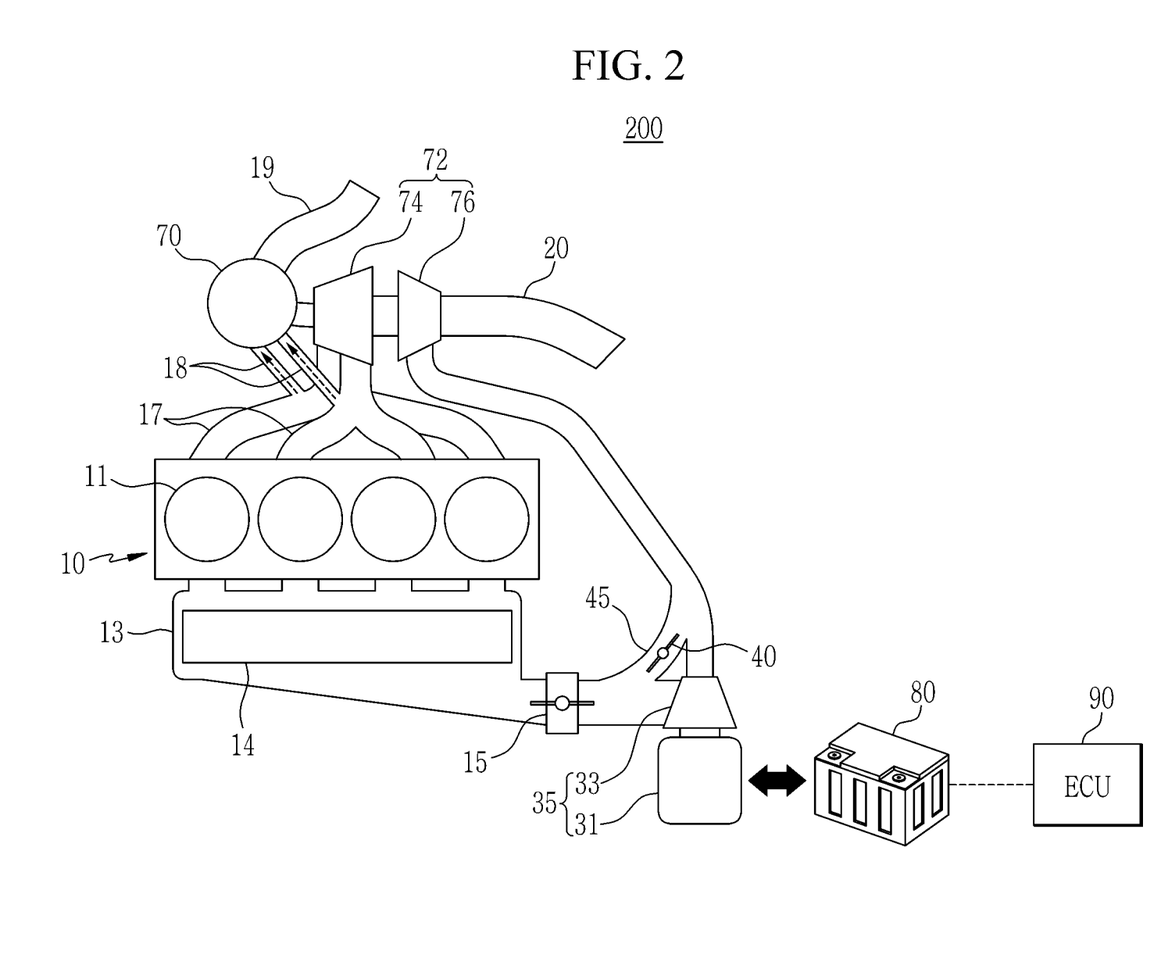
FIG. 2 is a conceptual diagram schematically showing an engine system according to various exemplary embodiments of the present invention.
Figure 3:
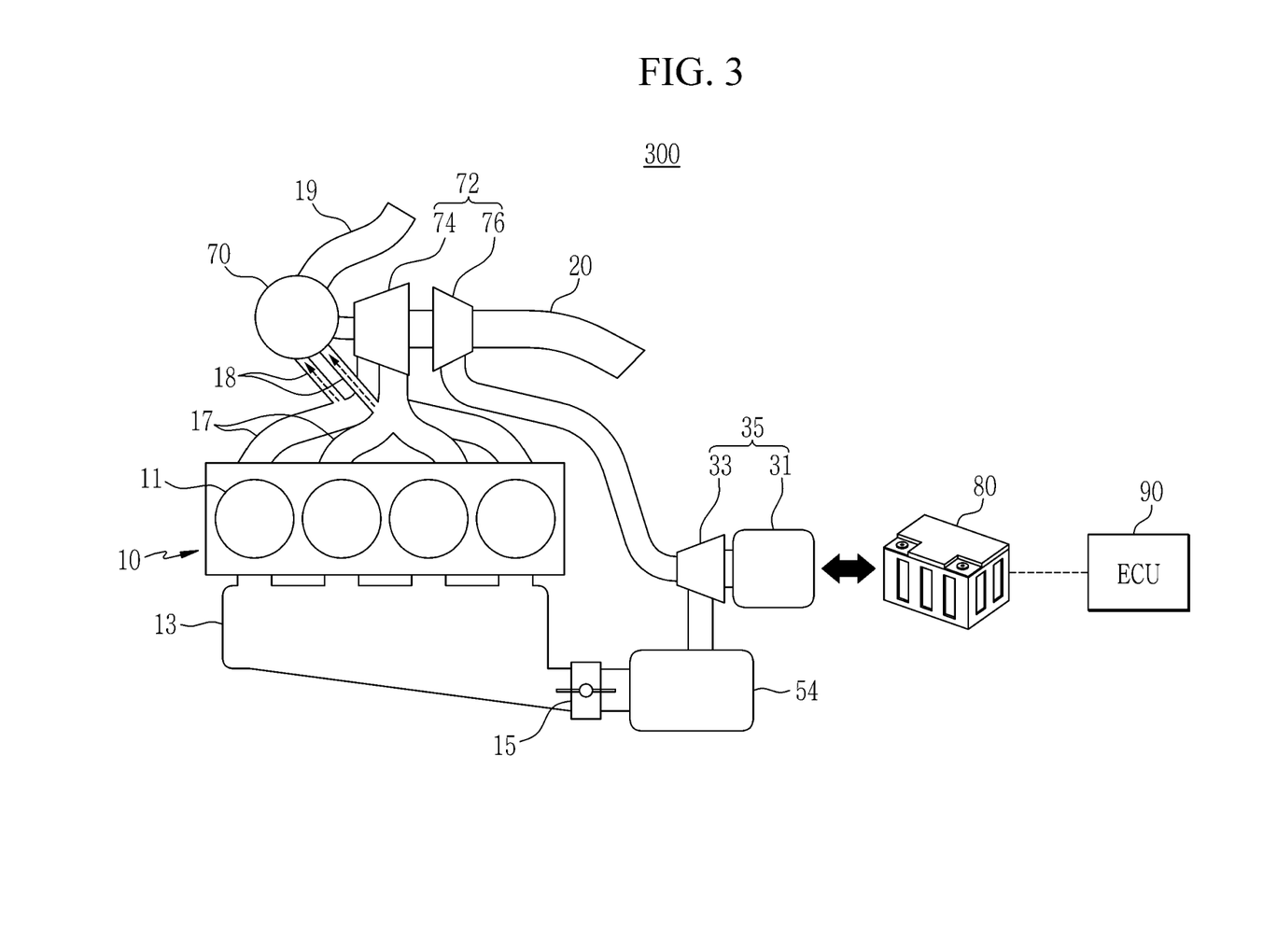
FIG. 3 is a conceptual diagram schematically showing an engine system according to various exemplary embodiments of the present invention.

FIG. 1 is a conceptual diagram schematically showing an engine system according to an exemplary embodiment of the present invention, FIG. 2 is a conceptual diagram schematically showing an engine system according to various exemplary embodiments of the present invention, and FIG. 3 is a conceptual diagram schematically showing an engine system according to various exemplary embodiments of the present invention.

Referring to FIG. 1, the engine system 100 includes an engine 10, an intake line 20, an intake manifold 13, an exhaust manifold 17, an exhaust line 19, a turbocharger 72, a wastegate passage 18, an electric supercharger 35, a power device 80, and a controller 90.

The engine 10 includes a plurality of combustion chambers 11 for generating a driving force by combustion of fuel, the intake air supplied to the combustion chamber 11 is supplied through the intake line 2, and the exhaust gas discharged from the combustion chamber 11 of the engine 10 is discharged to the outside through the exhaust manifold 17 and the exhaust line 19. At the instant time, an exhaust gas purifying device 70 may be provided in the exhaust line 19 for purifying the exhaust gas.

Furthermore, an air cleaner 52 for filtering outside air may be mounted at the inlet of the intake line 20.

The intake air flowing through the intake line 20 is supplied to the combustion chamber 11 through the intake manifold 13. A throttle valve 15 is mounted on the intake manifold 13 to regulate the air amount supplied to the combustion chamber 11.

Furthermore, a water-cooled intercooler 14 that cools the outside air flowing through the intake line 20 to the intake manifold 13 may be mounted inside the intake manifold 13 of the engine 10.

Meanwhile, as shown in FIG. 3, the engine system 100 according to the another exemplary embodiment of present invention may include an air-cooled intercooler 54 that cools the outside air flowing through the intake line 20 is mounted on the intake line 20 at the front end portion of the intake manifold 13 instead of the water-cooled intercooler 14 inside the intake manifold 13.

The turbocharger 72 includes a compressor 76 mounted in the intake line 20 and a turbine 74 that rotates in conjunction with the compressor 76 and is connected to the exhaust manifold 17 and the exhaust line 19. The turbocharger 72 supplies the boosted air to the combustion chamber 11. The outside air introduced from the intake line 20 is compressed by the compressor 76 of the turbocharger 72 and is supplied to the combustion chamber 11 through the intake manifold 13. The turbine 74 of the turbocharger 72 is rotated by the pressure of the combustion gas discharged from the engine 10 and the outside air drawn in from the intake line 20 is pushed to a pressure higher than atmospheric pressure by use of the rotational force.

Meanwhile, a three-way exhaust gas recirculation (EGR) valve may be mounted in the intake line 20 at the front end portion of the turbocharger 72. The amount of outdoor air drawn in from the intake line 20 into the compressor 76 of the turbocharger 72 may be adjusted according to the opening amount of the three-way EGR valve.

Meanwhile, the engine system according to an exemplary embodiment of the present invention may further include an exhaust gas recirculation device including an EGR recirculation line connecting the intake line 20 connected to the compressor 76 of the turbocharger 72 and the exhaust line 19 connected to the turbine 74 of the turbocharger 72, and an exhaust gas recirculation (EGR) cooler mounted in the EGR recirculation line.

An exhaust gas recirculation device implemented by the EGR recirculation line supplies a portion of the exhaust gas to the intake system of the engine 10 and into the combustion chamber 11 when it is necessary to reduce the amount of nitrogen oxides discharged according to the operating state of the engine 10. The exhaust gas which is an inert gas whose volume does not change relatively lowers the density of the mixture and the flame propagation speed is lowered when the fuel is burned so that the burning rate of the fuel is lowered and the rise of the combustion temperature is suppressed.

The wastegate passage 18 bypasses the turbine 74 of the turbocharger 72 from the exhaust manifold 17 to be connected to the exhaust line 19. The wastegate passage 18 has a fixed cross-sectional area of the passage, and the exhaust gas discharged from the exhaust manifold 17 bypasses through the wastegate passage 18 in a region where the rotation speed of the engine 10 is low, and flows into the turbine 74 in a region where the rotation speed of the engine 10 is high.

The engine speed is determined to be high if the engine speed is equal to or more than 1500 rpm, and determined to be low if the engine speed is less than 1500 rpm.

The electric supercharger 35 is for supplying supercharged air to the combustion chamber 11 and includes a motor 31 and an electric compressor 33. The electric compressor 33 is operated by the motor 31 to compress the outside air according to driving conditions and supply it to the combustion chamber 11.

The outside air passes through the compressor 76 of the turbocharger 72 through the intake line 20 and the compressed outside air is supplied to the electric supercharger 35. Meanwhile, as shown in FIG. 2, the engine system 200 according to the another exemplary embodiment of present invention may include a bypass line 45 which can bypass the outside air flowed from the intake line 20 so as not to pass through the electric supercharger 35 at the inlet of the electric supercharger 35, and a bypass valve 40 provided in the bypass line 45.

The power device 80 supplies electric power to the electric supercharger 35 or absorbs and stores electric power generated by the electric supercharger 35.

The controller 90 controls the operation of the power device 80 and the electric supercharger 35 according to rotation speed of the engine 10.

Figure 4:
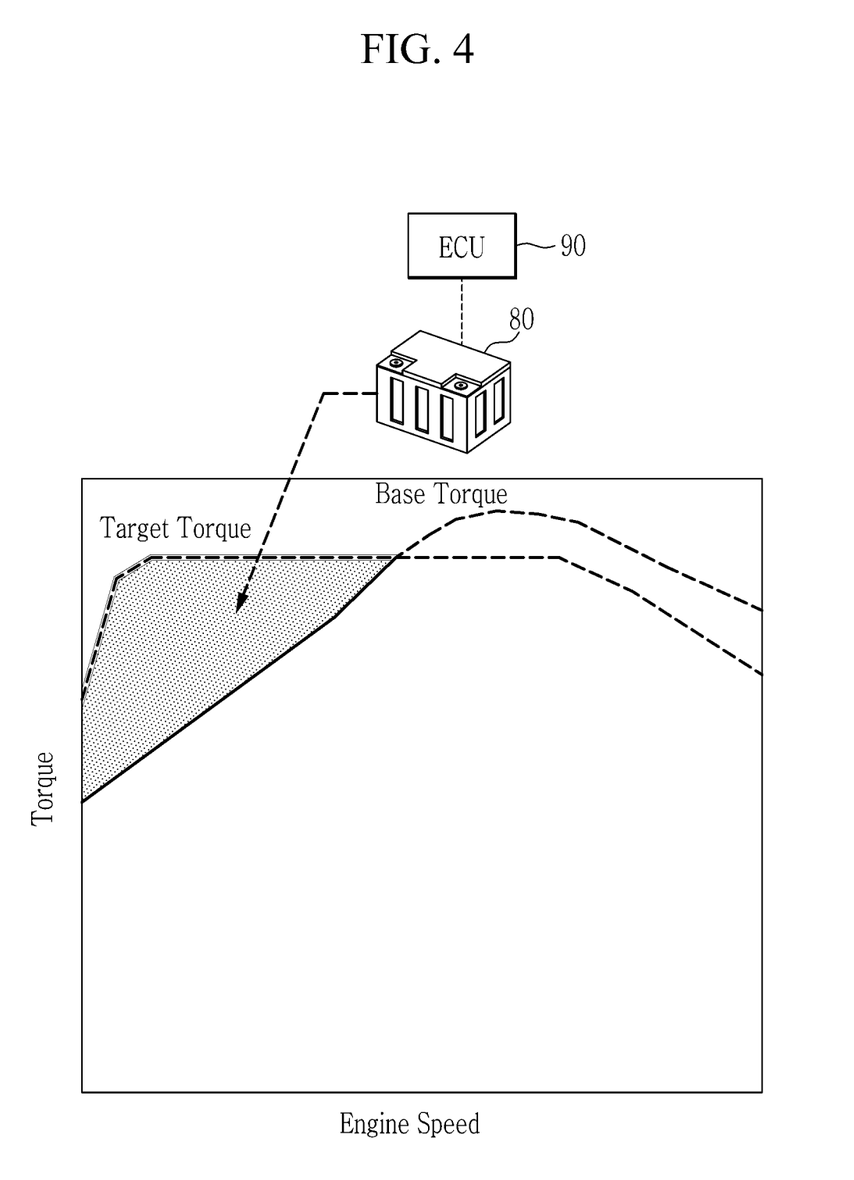
FIG. 4 is a conceptual diagram showing an engine system according to an exemplary embodiment of the present invention in which electric power is supplied from a power device to an electric supercharger in a region where the rotation speed of the engine is low to supplement the engine torque.
Figure 5:
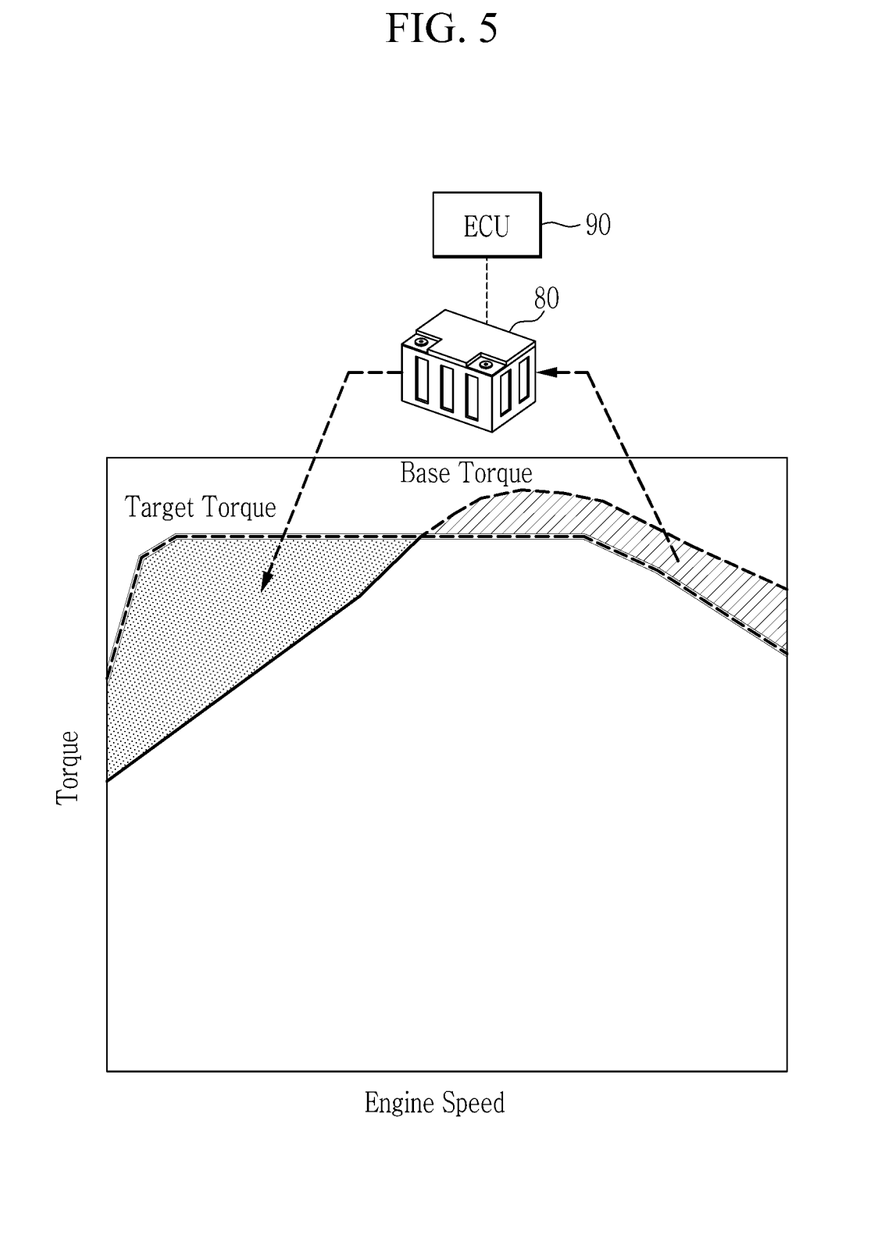
FIG. 5 is a conceptual diagram showing a state in which an extra boost energy is regenerated by utilizing an electromotive force generated by controlling the speed of an electric supercharger in a region where the rotation speed of the engine is high according to an exemplary embodiment of the present invention.

FIG. 4 is a conceptual diagram showing an engine system according to an exemplary embodiment of the present invention in which electric power is supplied from an power device to an electric supercharger in a region where the rotation speed of the engine is low to supplement the engine torque, and FIG. 5 is a conceptual diagram showing a state in which an extra boost energy is regenerated by utilizing an electromotive force generated by controlling the speed of an electric supercharger in a region where the rotation speed of the engine is high according to an exemplary embodiment of the present invention.

As shown in FIG. 4, the controller 90 can control the torque of the engine 10 to be supplemented by allowing the power device 80 to supply electric power to the electric supercharger 35 in the region where the rotation speed of the engine 10 is low. At the instant time, the controller 90 may determine that the engine 10 speed is high if the engine 10 speed is about 1500 rpm or more, and that the engine 10 speed is low if the engine 10 speed is less than about 1500 rpm.

If the electric supercharger 35 is not operated in the region where the rotation speed of the engine 10 is low, the exhaust gas is bypassed through the wastegate passage 18 having a fixed flow passage area, so that the torque of the engine 10 is low. Therefore, in the region where the rotation speed of the engine 10 is low, the controller 90 can supplement the torque of the engine 10 by controlling the flow of the exhaust gas into the turbocharger 72 by operating the electric supercharger 35.

Furthermore, as shown in FIG. 5, the controller 90 can control the speed of the electric supercharger 35 in the region where the rotation speed of the engine 10 is high to generate the differential pressure and regenerate the electromotive force generated thereby as boost energy.

Like this, according to an exemplary embodiment of the present invention, when the engine is in the low speed region, the electric power is supplied to the electric supercharger to minimize the back pressure, and as the residual gas in the combustion chamber is reduced, it is possible to improve combustion by high compression ignition.

Furthermore, during the high speed region boosting, the extra boost energy may be regenerated by utilizing the electromotive force generated by controlling the speed of the electric supercharger. Thus, it is possible to realize an efficient boosting system according to the surplus exhaust energy regeneration.

Furthermore, a fixed wastegate flow path is provided, and a conventional wastegate actuator is omitted. Therefore, the structure of the engine system may be simplified, and it is advantageous to mount the turbocharger.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An engine system, comprising:
    an engine including a plurality of combustion chambers generating driving torque by combustion of fuel;
    an intake manifold connected to an intake side of the plurality of combustion chambers;
    an intake line connected to the intake manifold and through which an outside air supplied to the plurality of combustion chambers flows;
    an exhaust manifold connected to an exhaust side of the plurality of combustion chambers;
    an exhaust line connected to the exhaust manifold and through which an exhaust gas flows;
    a turbocharger including a compressor mounted in the intake line, and a turbine rotating in association with the compressor and connected to the exhaust manifold and the exhaust line;
    a wastegate passage bypassing the turbine of the turbocharger from the exhaust manifold to be connected to the exhaust line;
    an electric supercharger connected to the compressor of the turbocharger by the intake line;
    a power device of supplying electric power to the electric supercharger or absorbing and storing electric power generated by the electric supercharger; and
    a controller connected to the power device and configured for controlling operation of the power device and the electric supercharger according to rotation speed of the engine,
    wherein the wastegate passage has a predetermined cross-sectional area, and the exhaust gas discharged from the exhaust manifold flows into the turbine or the wastegate passage according to the rotation speed of the engine, and
    wherein the exhaust gas flows into the wastegate passage and flows to the exhaust line when the rotation speed of the engine is lower than a predetermined rotation speed, and the exhaust gas flows into the turbine and flows to the exhaust line when the rotation speed of the engine is higher than the predetermined rotation speed.

2. The engine system of claim 1, further including:
    an air cleaner mounted at an inlet of the intake line and configured for filtering the outside air.

3. The engine system of claim 1, further including:
    a water-cooled intercooler mounted inside the intake manifold of the engine to cool the outside air flowing into the intake manifold through the intake line.

4. The engine system of claim 1, further including:
    an air-cooled intercooler mounted on the intake line at a front end portion of the intake manifold of the engine and configured for cooling the outside air flowing through the intake line.

5. The engine system of claim 4, wherein the air-cooled intercooler is disposed on the intake line between the intake manifold and the compressor.

6. The engine system of claim 1, further including:
    a throttle valve mounted at an intake manifold inlet of the engine and configured for controlling an air amount supplied to the plurality of combustion chambers.

7. The engine system of claim 1, further including:
    an exhaust gas purifying apparatus mounted on the exhaust line at a rear end portion of the exhaust manifold of the engine and configured for purifying the exhaust gas in the exhaust line.

8. The engine system of claim 1, further including:
    a bypass line connecting an inlet and an outlet of the electric supercharger and configured to bypass the outside air introduced from the intake line to prevent the outside air from passing through the supercharger; and
    a bypass valve mounted inside the bypass line.

9. The engine system of claim 1,
    wherein the controller is configured to control the power device to supplement an engine torque by supplying electric power to the electric supercharger to operate the electric supercharger in a region where the rotation speed of the engine is low.

10. The engine system of claim 9,
    wherein the controller is configured to control a speed of the electric supercharger to generate a differential pressure and to regenerate an electromotive force generated thereby as boost energy in a region where the rotation speed of the engine is high.

11. The engine system of claim 10,
    wherein the controller is configured to determine that the rotation speed of the engine is high when the rotation speed of the engine is equal to or more than 1500 rpm, and that the rotation speed of the engine is low when the rotation speed of the engine is less than 1500 rpm.

* * * * *